(12) United States Patent
Hornung et al.

(10) Patent No.: US 11,644,912 B2
(45) Date of Patent: May 9, 2023

(54) INTERFACE DEVICE AND ON-PANEL PAD

(71) Applicant: Wacom Co., Ltd., Saitama (JP)

(72) Inventors: Thilo Naoki Hornung, Saitama (JP);
Jui Min Liu, Saitama (JP); Yoshio Nomura, Saitama (JP); Kazuhiro Miyoshi, Saitama (JP); Shigeyuki Sano, Saitama (JP)

(73) Assignee: Wacom Co. Ltd., Saitama (JP)

( * ) Notice: Subject to any disclaimer, the term of this patent is extended or adjusted under 35 U.S.C. 154(b) by 0 days.

(21) Appl. No.: 17/166,589

(22) Filed: Feb. 3, 2021

(65) Prior Publication Data

US 2021/0157419 A1 May 27, 2021

Related U.S. Application Data

(63) Continuation of application No. PCT/JP2018/032164, filed on Aug. 30, 2018.

(51) Int. Cl.
*G06F 3/039* (2013.01)
*G06F 3/041* (2006.01)
(Continued)

(52) U.S. Cl.
CPC ............ *G06F 3/0393* (2019.05); *G06F 3/044* (2013.01); *G06F 3/0416* (2013.01); *G06F 3/04886* (2013.01); *G06F 3/03545* (2013.01)

(58) Field of Classification Search
CPC ...... G06F 3/0393; G06F 3/0416; G06F 3/044; G06F 3/04886; G06F 3/03545
(Continued)

(56) References Cited

U.S. PATENT DOCUMENTS

| 5,261,079 A | 11/1993 | Celi, Jr. |
| 2013/0038549 A1* | 2/2013 | Kitada ................ G06F 3/04886 345/173 |

(Continued)

FOREIGN PATENT DOCUMENTS

| JP | 2013-41320 A | 2/2013 |
| JP | 2014-238760 A | 12/2014 |

OTHER PUBLICATIONS

International Search Report, dated Nov. 27, 2018, for International Application No. PCT/JP2018/032164, 1 page.

(Continued)

*Primary Examiner* — Kwin Xie
(74) *Attorney, Agent, or Firm* — Seed IP Law Group LLP

(57) ABSTRACT

An interface device includes an on-panel pad and a sensor controller. The interface device is used to perform an input to an electronic device in response to an operation by a user on a capacitive touch panel display of the electronic device. The on-panel pad causes sensor electrodes included in the touch panel display to generate a two-dimensional pattern of capacitance while the on-panel pad is on the touch panel display. When the two-dimensional pattern generated while the on-panel pad is on the touch panel display has been detected, the sensor controller generates or outputs data including operation information in response to a change in capacitance in a region that is associated with the two-dimensional pattern and that receives an operation of the on-panel pad, the operation information indicating an operation state of the on-panel pad.

20 Claims, 14 Drawing Sheets

(51) Int. Cl.
*G06F 3/044* (2006.01)
*G06F 3/04886* (2022.01)
*G06F 3/0354* (2013.01)

(58) Field of Classification Search
USPC .................................. 345/173–174
See application file for complete search history.

(56) References Cited

U.S. PATENT DOCUMENTS

| | | | | |
|---|---|---|---|---|
| 2014/0168094 | A1* | 6/2014 | Milne | G09B 19/02 345/173 |
| 2015/0378492 | A1* | 12/2015 | Rosenberg | G06F 3/04144 345/174 |
| 2016/0077640 | A1* | 3/2016 | Brinkley | G06F 3/0446 345/173 |
| 2016/0292491 | A1* | 10/2016 | Dickerson | G06V 40/1324 |
| 2019/0034025 | A1* | 1/2019 | Izumi | G05B 19/042 |

OTHER PUBLICATIONS

Microsoft, "Use the On-Screen Keyboard (OSK) to type," accessed Jan. 20, 2021: <URL: https://support.microsoft.com/en-us/help/10762/windows-use-on-screen-keyboard>.

Kasahara, "Attraction of the 'Surface Dial' that Expands the Usage of Windows", Dec. 30, 2016, 11 pages.

Japanese Office Action, dated Feb. 1, 2022, for Japanese Application No. 2020-539959, 8 pages (with English translation).

* cited by examiner

| 94 | SMALL REGION (SENSOR COORDINATE SYSTEM XY) | OPERATION ELEMENT |
|---|---|---|
| | P001,P002,P003,P004 | Q |
| | P005,P006,P007,P008 | W |
| | P009,P010,P011,P012 | E |
| | P013,P014,P015,P016 | R |
| | P017,P018,P019,P020 | T |
| | .... | .... |
| | P101,P102,P103,P104 | Enter |
| | P105,P106,P107,P108 | Shift |
| | .... | .... |
| | P301,P302,P303,P304 | ↓ |
| | P305,P306,P307,P308 | → |

INTERFACE DEVICE AND ON-PANEL PAD

BACKGROUND

Technical Field

The present disclosure relates to an interface device and an on-panel pad.

Background Art

There is a known technique that causes software to emulate a hardware input device by displaying a virtual input device (e.g., a virtual keyboard or a screen keyboard) on a touch panel display. Such a technique is disclosed in, for example, U.S. Pat. No. 5,261,079 and "Use the On-Screen Keyboard (OSK) to type," Microsoft Corporation, Windows Support [retrieved on Aug. 17, 2018], Internet <URL: https://support.microsoft.com/en-us/help/10762/windows-use-on-screen-keyboard>.

When a user uses a physical input device, the user can quickly operate the input device by determining a home position where the user places the user's hand and moving the hand or finger while maintaining that position as a base position. However, when the user uses a virtual input device, the user cannot recognize the shape and arrangement of the device by simply touching a screen of the touch panel display. This makes it difficult for the user to maintain a home position. Consequently, the user has to visually check the display more frequently, resulting in the reduced operability.

BRIEF SUMMARY

It is desirable to provide an interface device and an on-panel pad capable of improving operability of a virtual input device.

An interface device according to a first aspect of the present disclosure performs an input to an electronic device in response to an operation by a user, the electronic device including a capacitive touch panel display, and includes an on-panel pad and a sensor controller. The on-panel pad, in operation, causes a plurality of sensor electrodes included in the touch panel display to generate a two-dimensional pattern of capacitance while the on-panel pad is on the touch panel display. When the two-dimensional pattern generated while the on-panel pad is on the touch panel display has been detected, the sensor controller generates or outputs data including operation information in response to a change in capacitance in a region that is associated with the detected two-dimensional pattern and that receives an operation of the on-panel pad, the operation information indicating an operation state of the on-panel pad.

An on-panel pad according to a second aspect of the present disclosure is used with an electronic device including a capacitive touch panel display and causes a sensor electrode included in the touch panel display to generate a two-dimensional pattern of capacitance with the on-panel pad arranged on the touch panel display.

According to the present disclosure, operability of a virtual input device can be improved.

BRIEF DESCRIPTION OF THE DRAWINGS

FIG. 2A is a planar perspective view of the on-panel pad illustrated in FIG. 1, while FIG. 2B is a cross-sectional view of the on-panel pad taken along line A-A of FIG. 2A;

FIG. 7A is a diagram illustrating a relative positional relation between a reference region and an operation region, while FIG. 7B is a diagram illustrating an example of a conversion table used for conversion processing;

FIG. 12A is a planar perspective view of the on-panel pad, while FIG. 12B is a cross-sectional view of the on-panel pad taken along line B-B of FIG. 12A;

DETAILED DESCRIPTION

An interface device and an on-panel pad according to an embodiment of the present disclosure will be described with reference to the accompanying drawings. The present disclosure is not limited to the following embodiment and modifications and it is a matter of course that any changes can be made to the present disclosure without departing from the scope of the present disclosure. The configurations described in the embodiment and modifications may also optionally be combined as long as no technical inconsistency arises.

Configuration of Interface Device 24
Overall Configuration of Position Detection System 10

Figure 1:
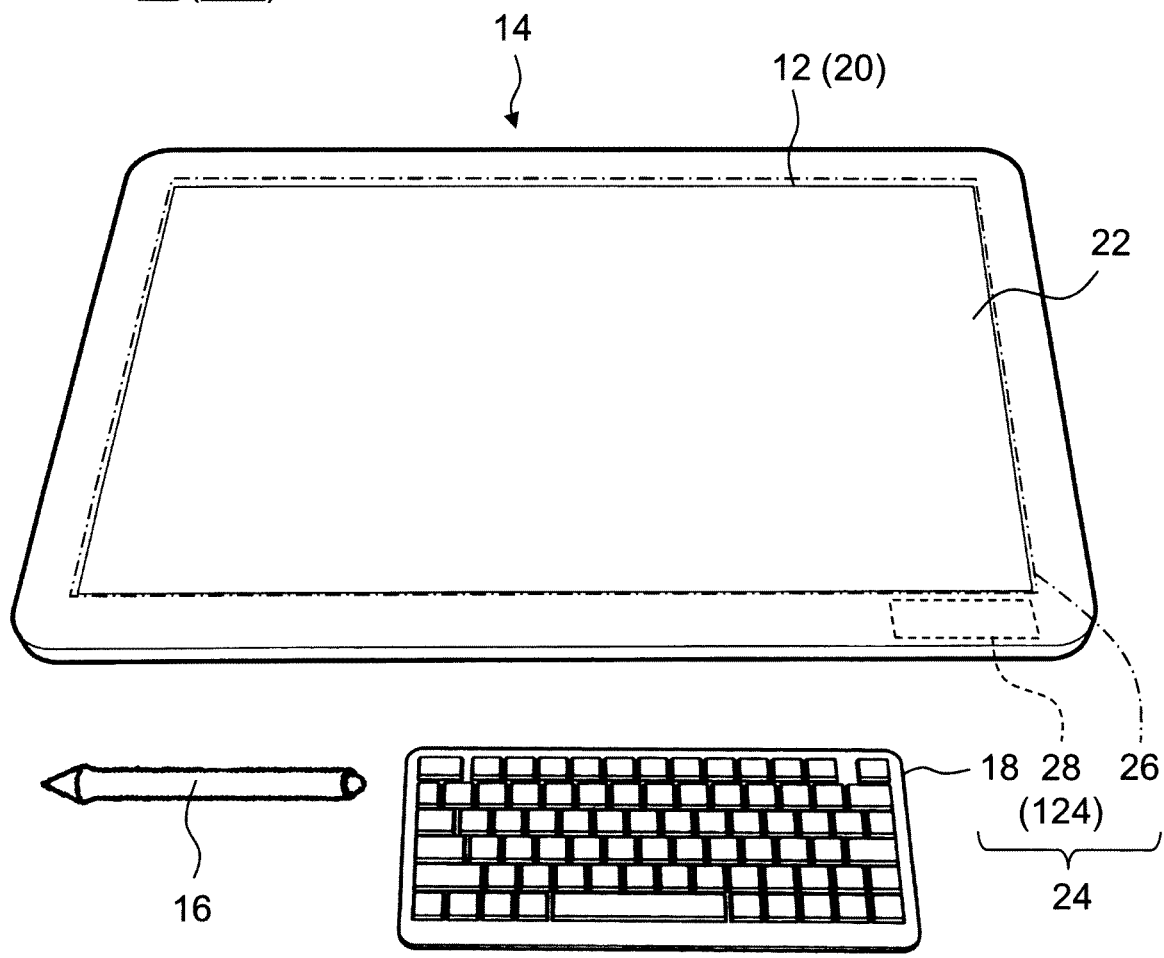
FIG. 1 is an overall configuration diagram of a position detection system in which an interface device according to an embodiment of the present disclosure is incorporated.

FIG. 1 is an overall configuration diagram of a position detection system 10 in which an interface device 24 according to an embodiment of the present disclosure is incorporated. The position detection system 10 includes an electronic device 14, a stylus 16, and an on-panel pad 18. The electronic device 14 includes a capacitive touch panel display 12. The stylus 16 is a pen-type pointing device. The on-panel pad 18 can be arranged at a desired position on the touch panel display 12.

The touch panel display 12 is a display device including a display panel 20 and a sensor electrode 26 overlaid on the display panel 20. Examples of the electronic device 14 include a tablet-type terminal, a smartphone, and a personal computer. The stylus 16 is an electronic pen that can communicate with the electronic device 14 in one direction or in both directions. For example, a user Us can write letters and draw pictures on the electronic device 14 by holding the stylus 16 with one hand and moving the stylus 16 while pressing the pen tip of the stylus 16 against a touch surface 22 of the touch panel display 12.

The interface device 24 is a device that uses the on-panel pad 18 to perform an input to the electronic device 14 in response to an operation by the user Us. The interface device 24 includes the on-panel pad 18, the sensor electrode 26, and a sensor controller 28. The sensor electrode 26 detects a state of the on-panel pad 18. The sensor controller 28 controls the operation of the sensor electrode 26.

Figure 2A:
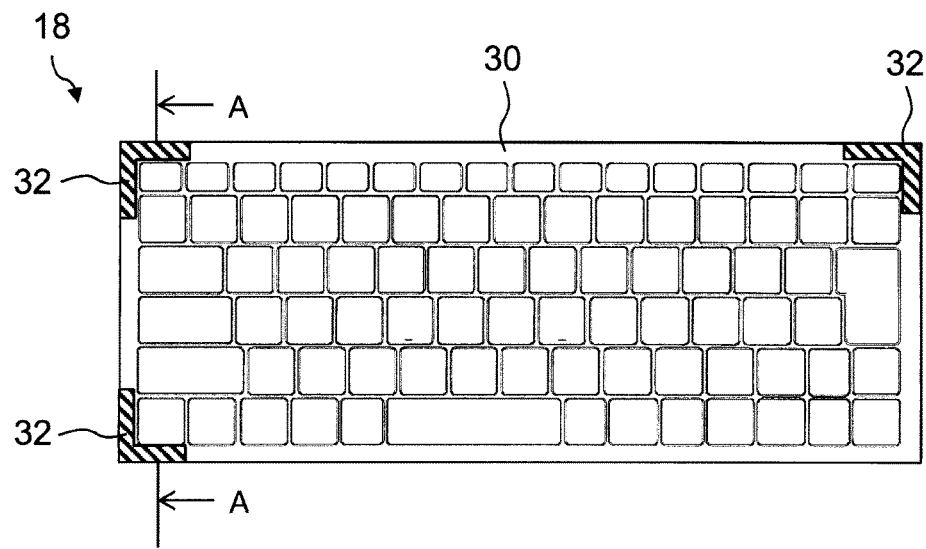
FIGS. 2A and 2B illustrate a detailed configuration of an on-panel pad illustrated in FIG. 1.
Figure 2B:
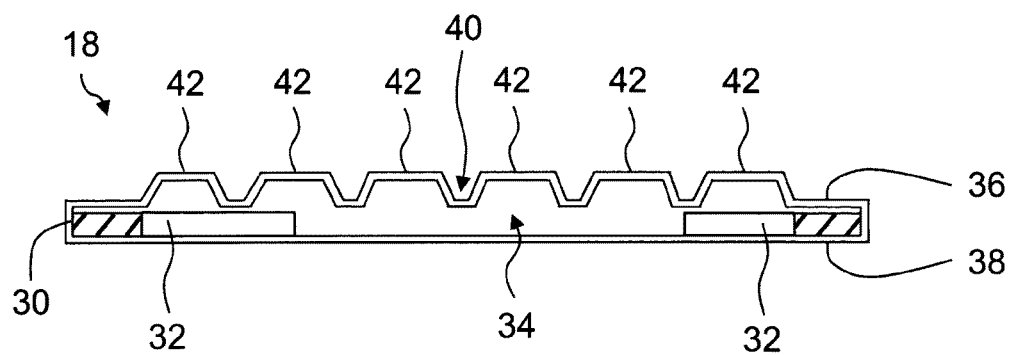

FIGS. 2A and 2B illustrate a detailed configuration of the on-panel pad 18 illustrated in FIG. 1. More specifically, FIG. 2A is a planar perspective view of the on-panel pad 18, while FIG. 2B is a cross-sectional view of the on-panel pad 18 taken along line A-A of FIG. 2A. The on-panel pad 18 is a pseudo physical device including a pad body 30, which emulates a keyboard, and one or more (three in this example) conductive members 32. The one or more conductive members 32 are arranged according to a layout (a combination of the position, shape, and number of members) unique to the type of the on-panel pad 18.

The pad body 30 has a three-dimensional solid or hollow shape. In the example illustrated in FIG. 2B, an interior 34 of the pad body 30 is filled with various fluids including air, for example, gas or liquid with a lower dielectric constant than that of the pad body 30. The pad body 30 is transparent or translucent in color and is made of a non-conductive and highly elastic material (e.g., a resin material). The pad body 30 can elastically deform when an external force is applied thereto and can be restored to its original shape when this external force is released.

The pad body 30 has a front surface 36 and a flat back surface 38. The front surface 36 has recessed portions and projected portions. Stepped portions 40 are formed on the front surface 36 of the pad body 30 so as to divide the front surface 36 into a plurality of small regions. In the example illustrated in FIGS. 2A and 2B, the stepped portions 40 form steps on the front surface 36 by their recessed shapes arranged in a mesh shape. Alternatively, the stepped portions 40 may form the steps on the front surface 36 by projected shapes. Hereinafter, the projected portions formed by the respective small regions will be referred to as operation elements 42.

Each of the conductive members 32 is an L-shaped planar member made of a material (e.g., metal) having a higher conductivity than that of the pad body 30. All the three conductive members 32 are fixed to an inner wall of the pad body 30. While these conductive members 32 are arranged inside the pad body 30 in the example illustrated in FIGS. 2A and 2B, the conductive members 32 may be arranged so as to be exposed on the outside of the pad body 30.

One of the conductive members 32 is arranged in the left back corner of the back surface 38. Another one of the conductive members 32 is arranged in the right back corner of the back surface 38. The remaining conductive member 32 is arranged in the left front corner of the back surface 38. As understood from FIG. 2B, each of the conductive members 32 is arranged so as not to overlap with any of the plurality of small regions (operation elements 42) in plan view.

Configuration of Electronic Device 14

Figure 3:
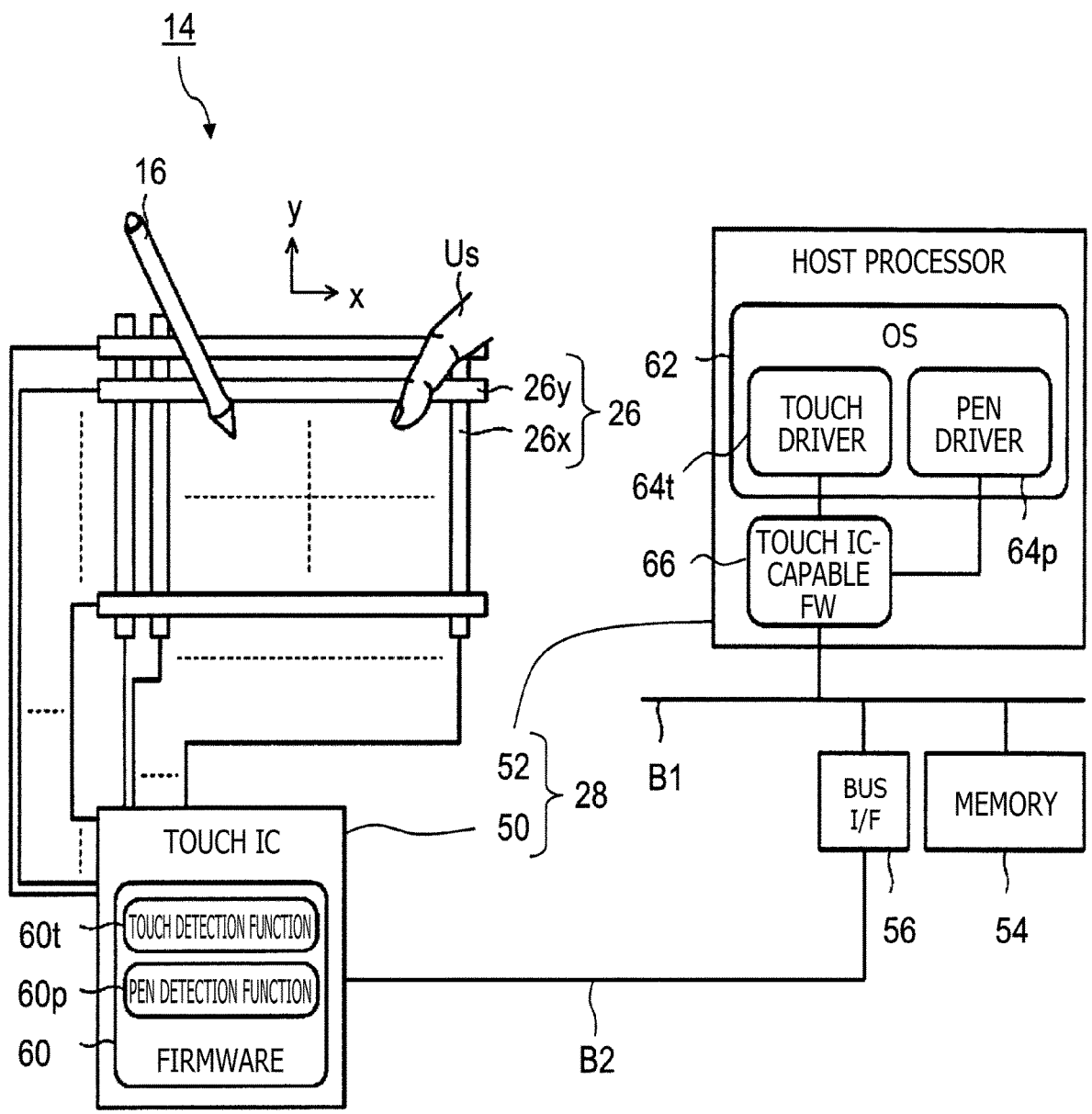
FIG. 3 is a schematic block diagram of an electronic device illustrated in FIG. 1.

FIG. 3 is a schematic block diagram of the electronic device 14 illustrated in FIG. 1. The electronic device 14 includes, in addition to the sensor electrode 26 described above, a touch integrated circuit (IC) 50, a host processor 52, and a memory 54. The host processor 52 and the memory 54 are connected to an internal bus B1. The touch IC 50 is connected to the internal bus B1 via an external bus B2 and a bus interface (IF) 56.

The sensor electrode 26 includes a plurality of electrodes arranged between the display panel 20 and the touch surface 22 (FIG. 1). The sensor electrode 26 includes a plurality of X electrodes 26$x$ and a plurality of Y electrodes 26$y$. The plurality of X electrodes 26$x$ detects the X coordinate (a position in the x direction). The plurality of Y electrodes 26$y$ detects the Y coordinate (a position in the y direction). The X electrodes 26$x$ extend in the y direction and are evenly spaced along the x direction. The Y electrodes 26$y$ extend in the x direction and are evenly spaced along the y direction. The x direction and y direction illustrated in FIG. 3 respectively correspond to the X axis and Y axis of a rectangular coordinate system (hereinafter referred to as a sensor coordinate system) defined on the plane formed by the sensor electrode 26.

The sensor controller 28 is a control circuit for acquiring input information via the sensor electrode 26 and includes the touch IC 50 (a first processor) and the host processor 52 (a second processor). The touch IC 50 and the host processor 52 are connected to each other via the internal bus B1 and the external bus B2.

The touch IC 50 is an integrated circuit that can execute firmware 60 and is connected to each of the plurality of electrodes included in the sensor electrode 26. In one or more embodiments, the touch IC 50 includes a processor that executes instructions included in the firmware 60. The firmware 60 includes firmware 60$t$ that is configured so as to implement a touch detection function and firmware 60$p$ that is configured so as to implement a pen detection function. The firmware 60$t$ that is configured so as to implement the touch detection function detects a touch made by the user Us or the on-panel pad 18. The firmware 60$p$ that is configured so as to implement the pen detection function detects a state of the stylus 16. The firmware 60$t$ that is configured so as to implement the touch detection function implements, for example, a two-dimensional scanning function of the sensor electrode 26 and a function of generating a heat map 80 (see FIG. 6) on the sensor electrode 26. The firmware 60$p$ that is configured so as to implement the pen detection function implements, for example, a two-dimensional scanning function of the sensor electrode 26, a function of receiving and analyzing downlink signals, a function of estimating the state of the stylus 16 (e.g., position, attitude, and pen pressure), and a function of generating and transmitting uplink signals including commands to the stylus 16.

The host processor 52 is a processor having relatively higher computing power than that of the touch IC 50 and includes a central processing unit (CPU) or a graphical processing unit (GPU), for example. The host processor 52 controls each component of the electronic device 14 by executing an operating system (hereinafter referred to as an OS 62). The host processor 52 performs desired processing (for example, a touch driver 64$t$, a pen driver 64$p$, or a touch IC-capable firmware (FW) 66) by reading and executing a program stored in the memory 54.

The touch IC-capable FW 66 processes data received from the touch IC 50 and provides the OS 62 with data in a format suitable for the OS 62 to perform information processing. The touch driver 64*t* or the pen driver 64*p* provides data supplied from the touch IC-capable FW 66 to a drawing application running on the OS 62. The drawing application uses input information received from the touch driver 64*t* or the pen driver 64*p* to perform ink data generation processing and rendering processing. This allows the user Us to check the input result of the user Us's own operation on the touch panel display 12 (more specifically, the display panel 20).

Operation of Interface Device 24

The interface device 24 according to the present embodiment is configured as described above. Next, the operation of the interface device 24 will now be described with reference to a flowchart illustrated in FIG. 4. The touch IC 50 performs blocks S1 and S2. The touch IC-capable FW 66 of the host processor 52 performs blocks S4 to S9. The OS 62 of the host processor 52 performs blocks S10 and S11.

In block S1, the touch IC 50 sequentially transmits a pulse signal to each X electrode 26*x* and receives a signal indicating a current value from each Y electrode 26*y*, thereby receiving detection signals. The detection signals indicate the detected levels of capacitance on the sensor electrode 26.

In block S2, the touch IC 50 generates the heat map 80 based on the detection signals received in block S1 and outputs the heat map 80 to the host processor 52. The heat map 80 represents changes in capacitance on the sensor electrode 26.

Figure 5A:
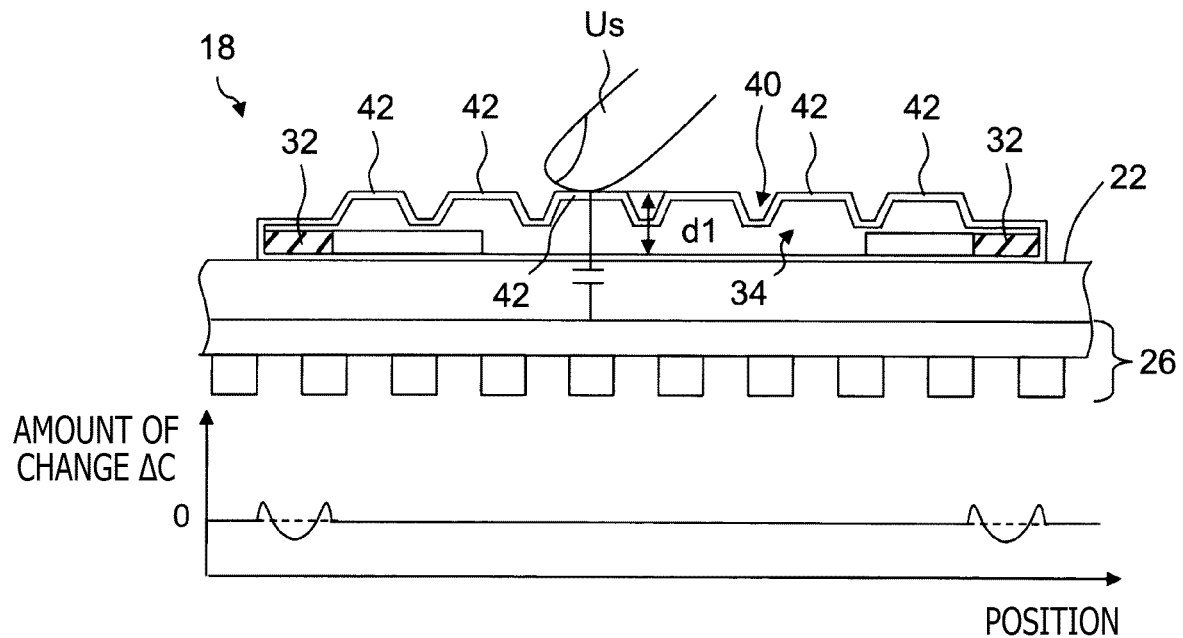
FIGS. 5A and 5B are diagrams each schematically illustrating a correspondence relation between an operation state of the on-panel pad illustrated in FIGS. 2A and 2B and a detection profile.
Figure 5B:
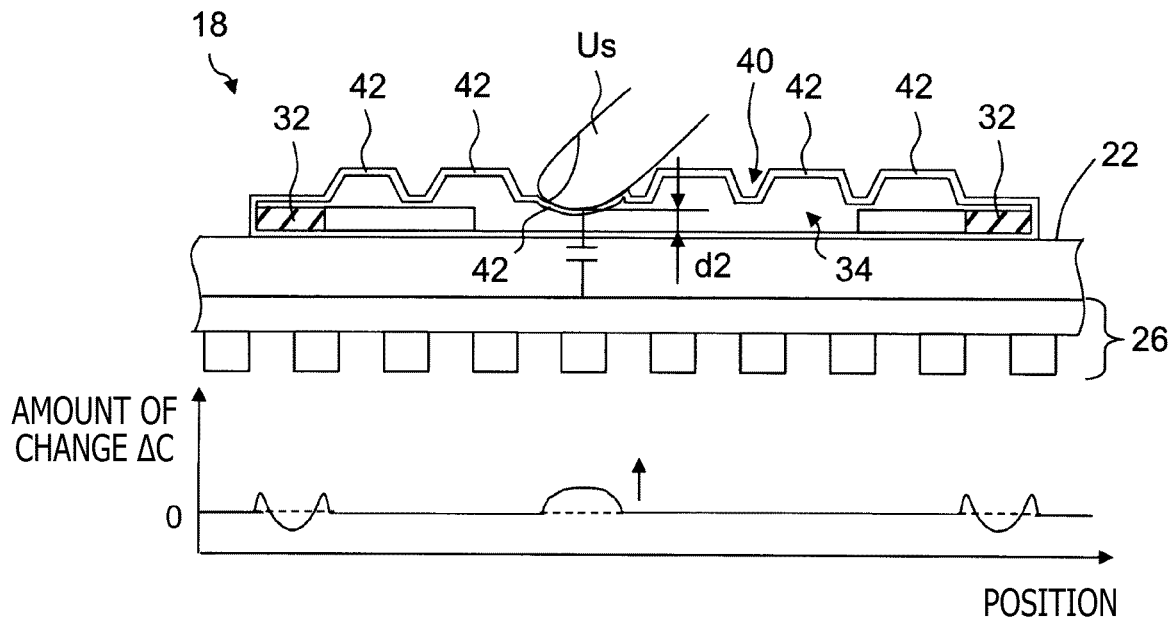

FIGS. 5A and 5B are diagrams each schematically illustrating a correspondence relation between the operation state of the on-panel pad 18 illustrated in FIGS. 2A and 2B and a detection profile. The detection profile corresponds to a graph representing an amount of change ΔC in capacitance at each of the positions on the sensor electrode 26.

With reference to FIG. 5A, a finger of the user Us is in contact with one of the operation elements 42 of the pad body 30. Since each of the conductive members 32 is located close to the touch surface 22, a change in capacitance is detected at the positions of the conductive members 32. Here, the capacitance at the positions where the conductive members 32 are located changes to the negative side while the capacitance in the vicinity of the conductive members 32 changes to the positive side. On the other hand, since the finger of the user Us is at a position (distance d1) sufficiently distant from the sensor electrode 26, a change in the capacitance at the position of the finger is undetectable or the amount of change is small. In other words, there is no change in capacitance over the period before and the period after the user Us contacts the front surface 36 of the pad body 30 maintaining the original shape.

With reference to FIG. 5B, the finger of the user Us is pushing the operation element 42 of the pad body 30. Since the finger of the user Us approaches the sensor electrode 26 (distance d2<d1), a change in capacitance (the positive side) is detected at the position of the finger. That is, in a portion of the sensor electrode 26 corresponding to the position pushed by the user Us from the front surface 36 of the pad body 30, the capacitance changes due to the approach of the user Us as a conductor to the portion of the sensor electrode 26.

The detection profile in FIG. 5A represents a state where the on-panel pad 18 has not been operated (the operation element 42 has not been pushed), while the detection profile in FIG. 5B represents a state where the on-panel pad 18 has been operated. The sensitivity when the operation element 42 is pushed is adjusted as needed by changing the material and thickness of the pad body 30, the pressure of the filled gas, or the filling amount of liquid, for example.

In block S3, the touch IC-capable FW 66 performs processing of detecting a two-dimensional pattern PT on the heat map 80 generated in block S2. Specifically, the touch IC-capable FW 66 reads a plurality of templates (two-dimensional patterns PT) stored in the memory 54 and performs matching processing using various techniques.

Figure 6:
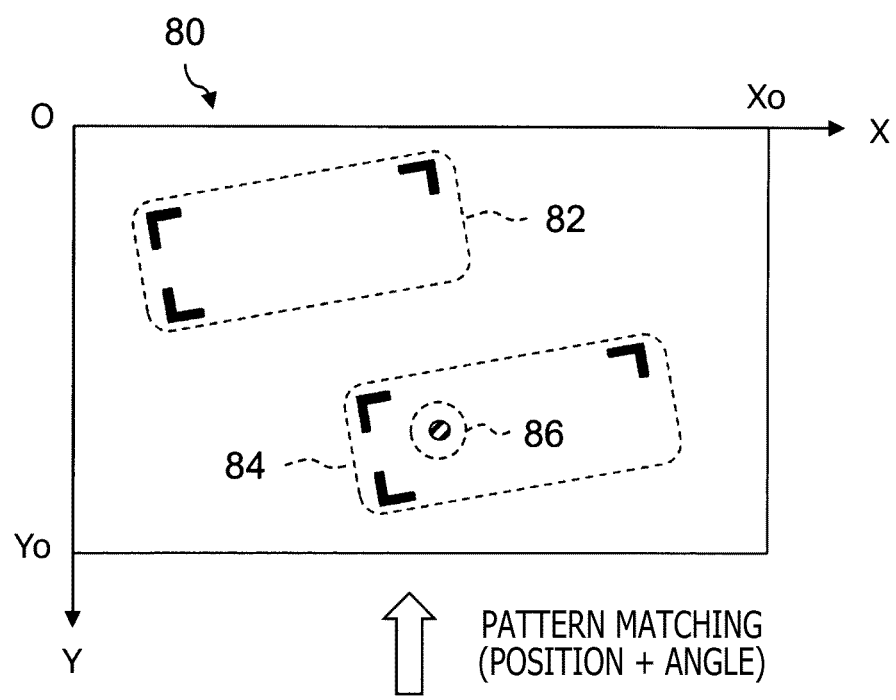
FIG. 6 is a diagram illustrating an example of a method of detecting a two-dimensional pattern.
Figure 6:
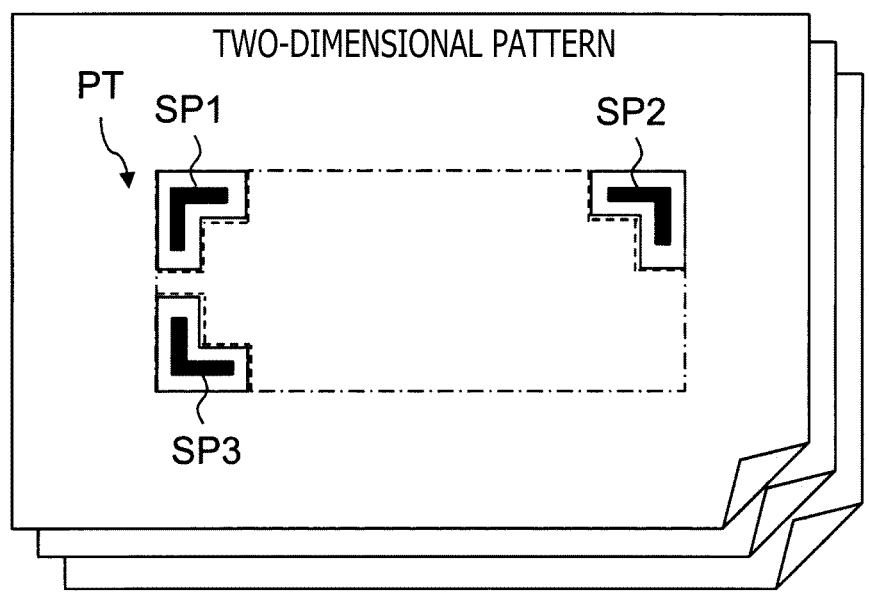

FIG. 6 is a diagram illustrating an example of a method of detecting a two-dimensional pattern PT. The heat map 80 illustrated in the upper part of FIG. 6 is defined within a predetermined rectangular region (0≤X≤Xo, 0≤Y≤Yo). Each hatched or filled closed region corresponds to a region where a touch has been detected. The remaining blank region corresponds to a region where no touch has been detected. Specifically, the hatched closed region corresponds to a detected region where the amount of change is positive (ΔC>0). The filled closed regions correspond to detected regions where the amount of change is negative (ΔC<0). For example, the heat map 80 includes a pad region 82 (when no operation has been made) or a pad region 84 (when operation has been made). The pad region 82 and the pad region 84 correspond to the on-panel pad 18.

The template illustrated in the lower part of FIG. 6 represents a two-dimensional pattern PT including three sub-patterns SP1, SP2, and SP3. The three regions enclosed by solid lines correspond to regions used to determine the pattern consistency. One region surrounded by a dashed-and-dotted line corresponds to any region that is not used to determine the pattern consistency. The two-dimensional pattern PT is unique to the type of the on-panel pad 18 and is a rotationally asymmetric pattern.

The touch IC-capable FW 66 sequentially calculates an index indicating the pattern consistency (hereinafter referred to as the degree of consistency) while changing the position and angle of the two-dimensional pattern PT and detects the two-dimensional pattern PT by determining whether the degree of consistency is large. With the on-panel pad 18 arranged on the touch panel display 12, both the pad regions 82 and 84 are detected regardless of whether or not the operation has been made. When there is a plurality of templates prepared, the touch IC-capable FW 66 performs the detection processing for each template according to the same procedure as above.

In block S4, the touch IC-capable FW 66 checks whether or not the heat map 80 includes any two-dimensional pattern PT by referring to the detection result in block S3. When the heat map 80 includes no two-dimensional pattern PT that matches (block S4: NO), the touch IC-capable FW 66 proceeds to block S5.

In block S5, the touch IC-capable FW 66 generates data including information (i.e., position information) indicating the position where the touch has been detected and supplies the data to the OS 62. The host processor 52 then processes the data supplied from the touch IC-capable FW 66 and performs an operation corresponding to the input information (here, the position where the touch has been detected) received from the sensor electrode 26 (block S11).

Returning to block S4, when the heat map 80 includes the two-dimensional pattern PT that matches as illustrated in FIG. 6 (block S4: YES), the touch IC-capable FW 66 proceeds to block S6.

In block S6, the touch IC-capable FW 66 sets at least one region (hereinafter referred to as an operation region 92) corresponding to the arrangement of the two-dimensional pattern PT detected in block S3. The operation region 92 refers to a two-dimensional region that can receive operations of the on-panel pad 18. For example, only one region is set as the operation region 92 so as to circumscribe the three sub-patterns SP1 to SP3 (see FIG. 7A).

In block S7, the touch IC-capable FW 66 checks whether or not at least one touch region 86 is present within the operation region 92 set in block S6. When only the pad region 82 is present on the heat map 80 of FIG. 6, there is no touch region within the pad region 82 (block S7: NO). Accordingly, the touch IC-capable FW 66 omits block S8 and proceeds to block S9. By contrast, when only the pad region 84 is present on the heat map 80 of FIG. 6, the single touch region 86 is present within the pad region 84 (block S7: YES). Accordingly, the touch IC-capable FW 66 proceeds to block S8.

In block S8, the touch IC-capable FW 66 performs data conversion processing by which the detected position in the operation region 92 checked in block S7 is converted into the type of the operation element 42 in the on-panel pad 18. This data conversion method will be described in detail with reference to FIGS. 7A and 7B.

Figures 7A, 7B:
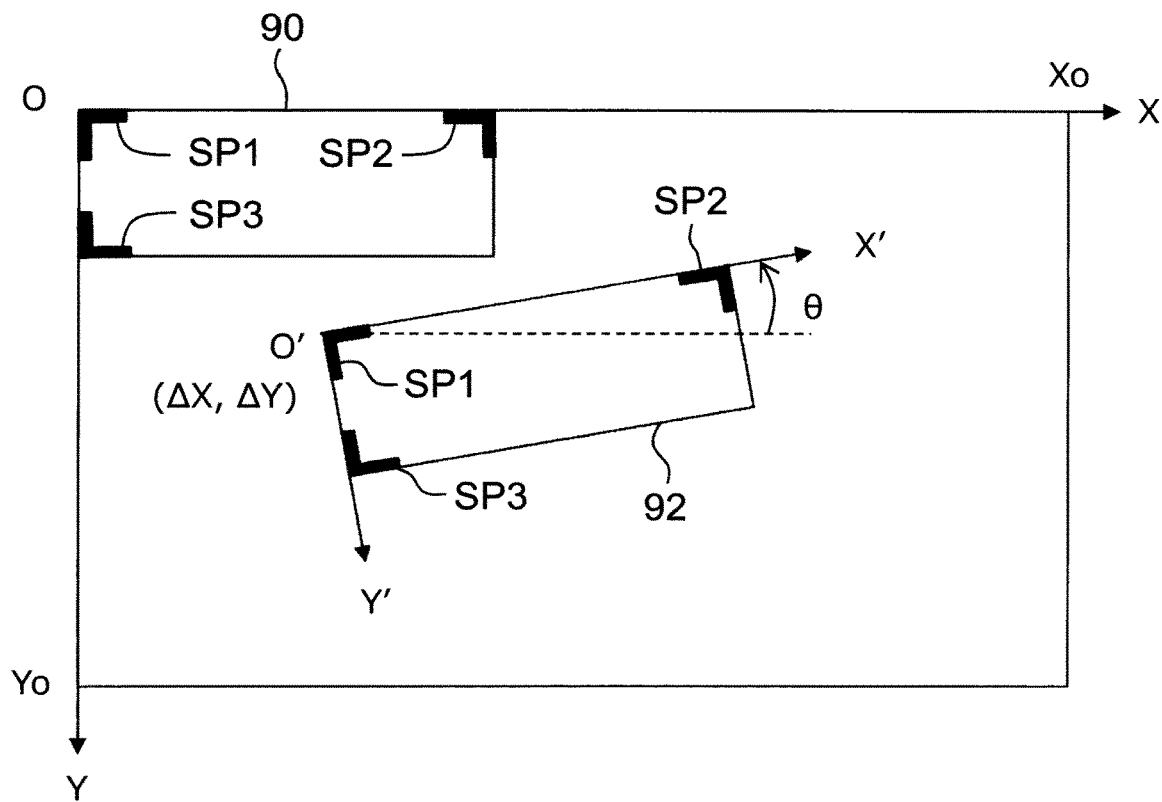
FIGS. 7A and 7B illustrate an example of a data conversion method.

FIG. 7A is a diagram illustrating a relative positional relation between a reference region 90 and the operation region 92. The reference region 90 is a rectangular region having feature points (L-shaped bending points) of the sub-patterns SP1 to SP3 as three vertices. Here, a planar coordinate system (i.e., a sensor coordinate system XY) is defined with the feature point (0, 0) of the sub-pattern SP1 as an origin O. The X axis of the sensor coordinate system corresponds to the linear direction connecting the feature points of the sub-patterns SP1 and SP2. The Y axis of the sensor coordinate system corresponds to the linear direction connecting feature points of the sub-patterns SP1 and SP3.

The operation region 92 has the same shape as that of the reference region 90. Here, a planar coordinate system (hereinafter referred to as a device coordinate system X'Y') is defined with a feature point ($\Delta X$, $\Delta Y$) of the sub-pattern SP1 as an origin O'. The X' axis of the device coordinate system corresponds to the linear direction connecting feature points of the sub-patterns SP1 and SP2. The Y' axis of the device coordinate system corresponds to the linear direction connecting feature points of the sub-patterns SP1 and SP3. Here, the X' axis (Y' axis) is assumed to be inclined with respect to the X axis (Y axis) by an angle $\theta$. The angle $\theta$ is uniquely determined by making the two-dimensional pattern PT rotationally asymmetric.

The touch IC-capable FW 66 converts the device coordinate system X'Y' into the sensor coordinate system XY by affine transformation based on the three conversion parameters $\Delta X$, $\Delta Y$, and $\theta$ described above, thereby calculating the coordinates of the touch region 86 corresponding to the reference region 90.

FIG. 7B is a diagram illustrating an example of a conversion table 94 used for the conversion processing. The conversion table 94 is table data corresponding to the on-panel pad 18 and describes a correspondence relation between range information indicating the range of each small region and the type of the corresponding operation element 42. For example, when each small region has a square shape, the range information includes positions (e.g., P001→P002→P003→P004→P001) on the sensor coordinate system that indicate four vertices. For example, the types of the operation elements 42 include alphabetic characters including Q, W, E, R, and T, numbers including 1, 2, and 3, modifier keys including Enter and Shift, and arrow keys including ↓ (down) and → (right). By referring to the conversion table 94 described above, the touch IC-capable FW 66 identifies a small region to which the coordinates after the affine transformation belong and acquires the type of the operation element 42 associated with the corresponding small region. For example, when the coordinates after the transformation belong to a small region surrounded by P017 to P020, the touch IC-capable FW 66 acquires "T" as the type of the operation element 42.

In block S9, the touch IC-capable FW 66 generates data including information (hereinafter referred to as operation information) indicating the operation state of the on-panel pad 18 and supplies the data to the OS 62. The operation information includes the type of the on-panel pad 18 (or a virtual input device 96), the arrangement state of the on-panel pad 18 (specifically, the conversion parameters $\Delta X$, $\Delta Y$, and $\theta$), and whether or not any operation element 42 has been operated. Unlike block S5, the touch IC-capable FW 66 outputs the operation information instead of the coordinate information.

In block S10, the host processor 52 performs control for causing the virtual input device 96 corresponding to the type of the on-panel pad 18 to be displayed on the touch panel display 12 (more specifically, the display panel 20) based on the operation information acquired from the data output in block S9. Specifically, the host processor 52 reads a template image of the virtual input device 96 from the memory 54 and then performs image processing corresponding to the conversion parameters. After that, the host processor 52 outputs the processed image data to the display panel 20 as display data. The operation of the touch panel display 12 associated with this control will be described with reference to transition diagrams illustrated in FIGS. 8A to 9B.

Figure 4:
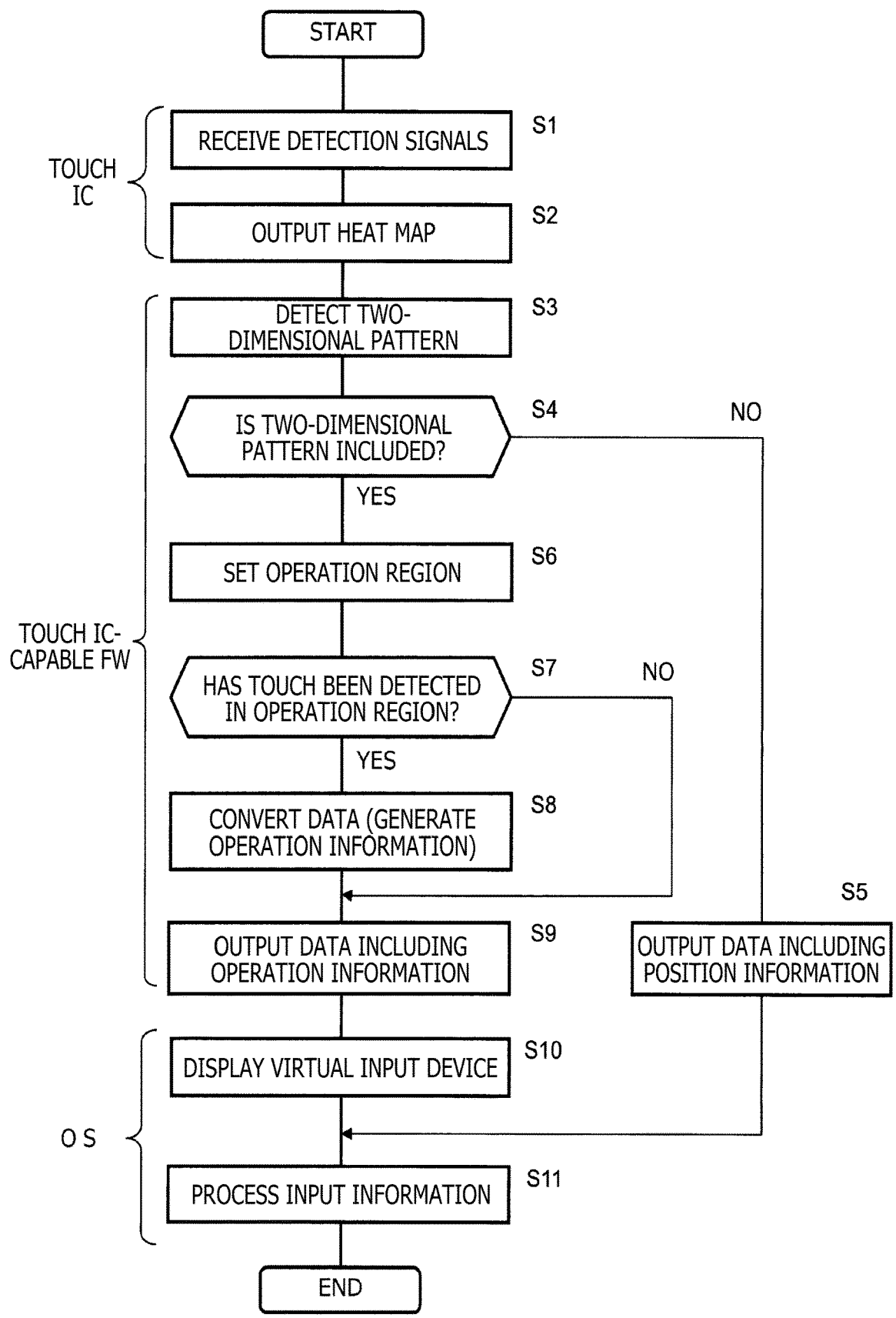
FIG. 4 is a flowchart for describing an operation of the interface device.
Figure 8A:
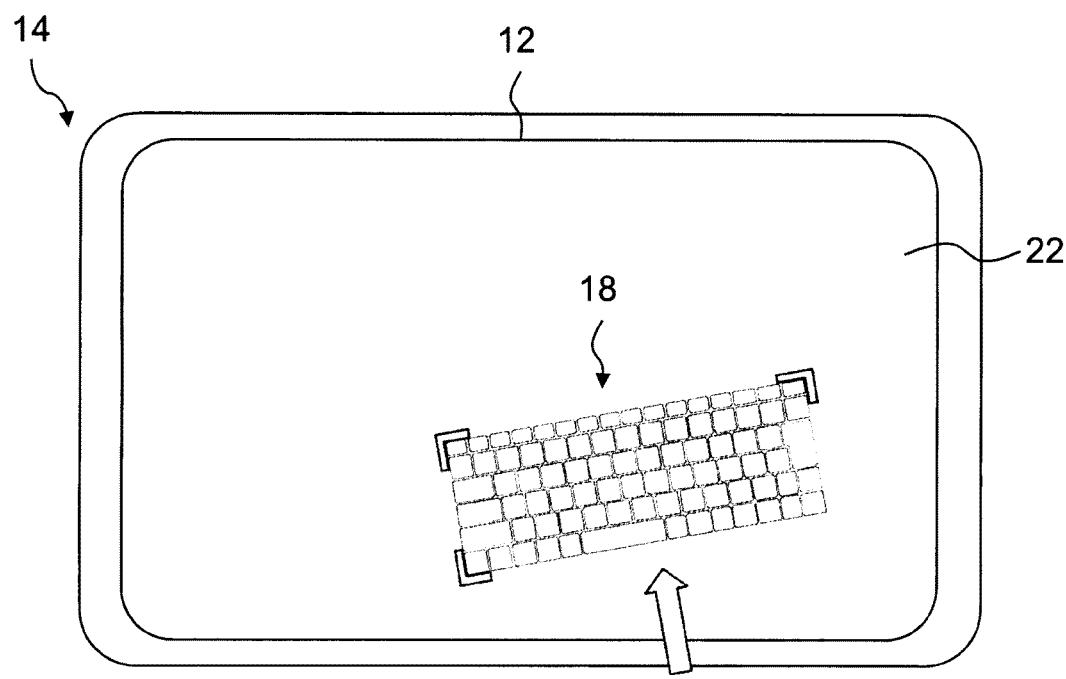
FIGS. 8A and 8B are transition diagrams of a display state of a touch panel display.

As illustrated in FIG. 8A, assume that when the user Us, not illustrated, starts using the on-panel pad 18, the user Us arranges the on-panel pad 18 on the touch panel display 12 at a position and orientation suitable for how the electronic device 14 is used. Then, the generation of the two-dimensional pattern PT of capacitance triggers a transition from the state of FIG. 8A to the state of FIG. 8B after blocks S5 to S9 of FIG. 4 are performed.

Figure 8B:
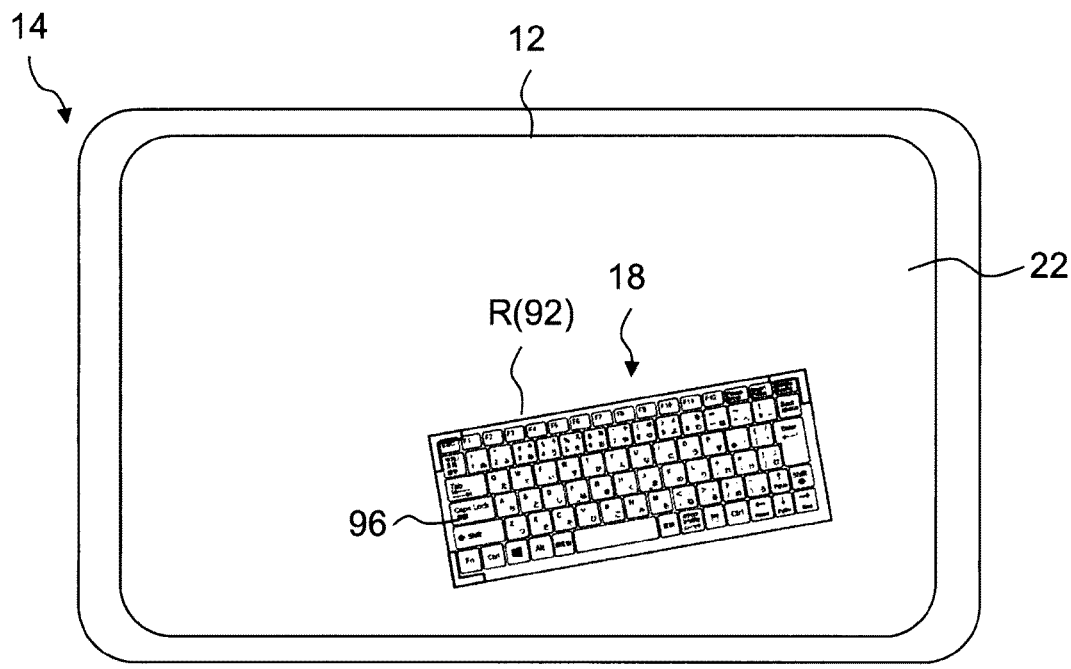

As illustrated in FIG. 8B, the virtual input device 96 emulating a keyboard is displayed at a position overlapping with the on-panel pad 18 (here, within a display region R that corresponds to the operation region 92). The virtual input device 96 is an image in which characters indicating the types of the operation elements 42 of the on-panel pad 18 are two-dimensionally arranged according to a desired key arrangement. In other words, the on-panel pad 18 provides its input function as the "pseudo physical device" with the on-panel pad 18 arranged on the touch panel display 12.

For example, the user Us can quickly operate the input device by determining a home position where the user places the user's hand and moving his or her hand or finger while maintaining that position as a base position. This is because the user Us can recognize, without relying on the user's own vision, not only the shape and arrangement of the virtual input device 96, but also the sense of operation through the sense of touch.

When the user Us wants to adjust the arrangement of the on-panel pad 18, the user Us moves the on-panel pad 18 to a desired position and orientation. Accordingly, the two-dimensional pattern PT that has been changed in position or orientation is detected again, and as a result, the virtual input device 96 is displayed following the movement of the on-panel pad 18.

Figure 9A:
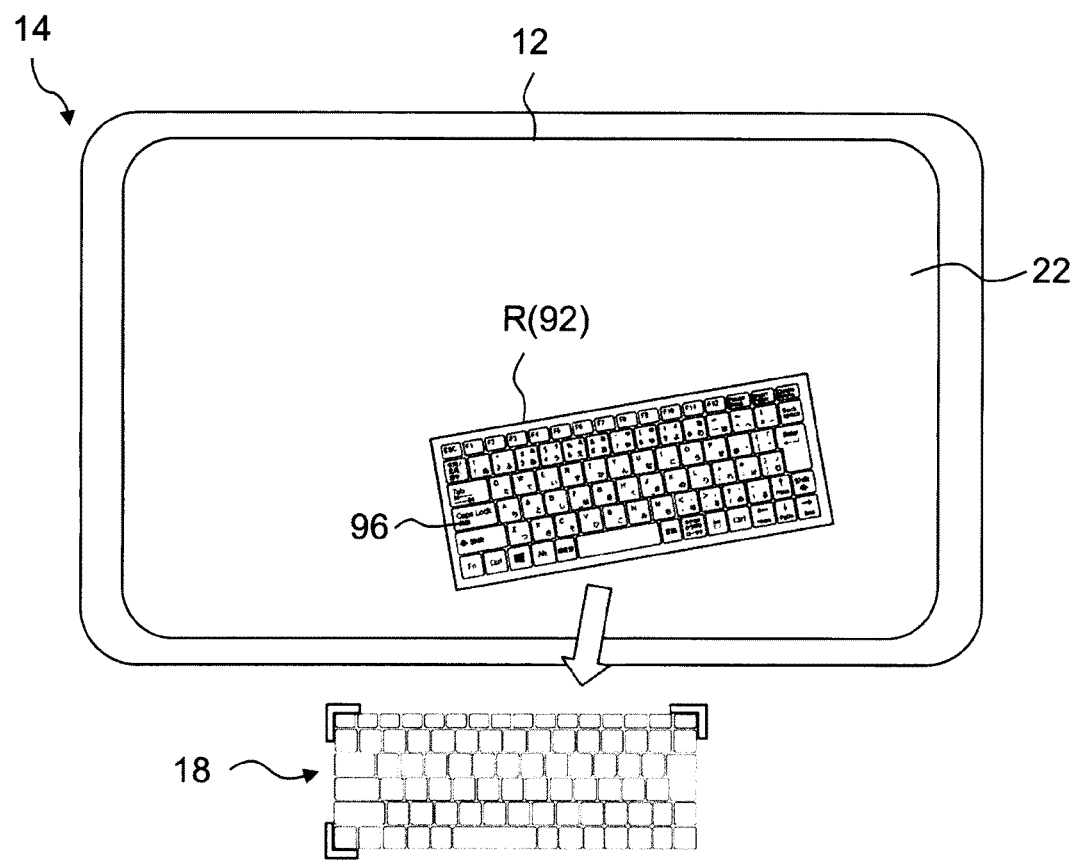
FIGS. 9A and 9B are transition diagrams of a display state of the touch panel display.

As illustrated in FIG. 9A, assume that when the user Us finishes using the on-panel pad 18, the user Us removes the on-panel pad 18 and places the on-panel pad 18 at a position away from the touch panel display 12. Then, the disappearance of the two-dimensional pattern PT of capacitance triggers a transition from the state of FIG. 9A to the state of FIG. 9B after block S5 of FIG. 4 is performed.

Figure 9B:
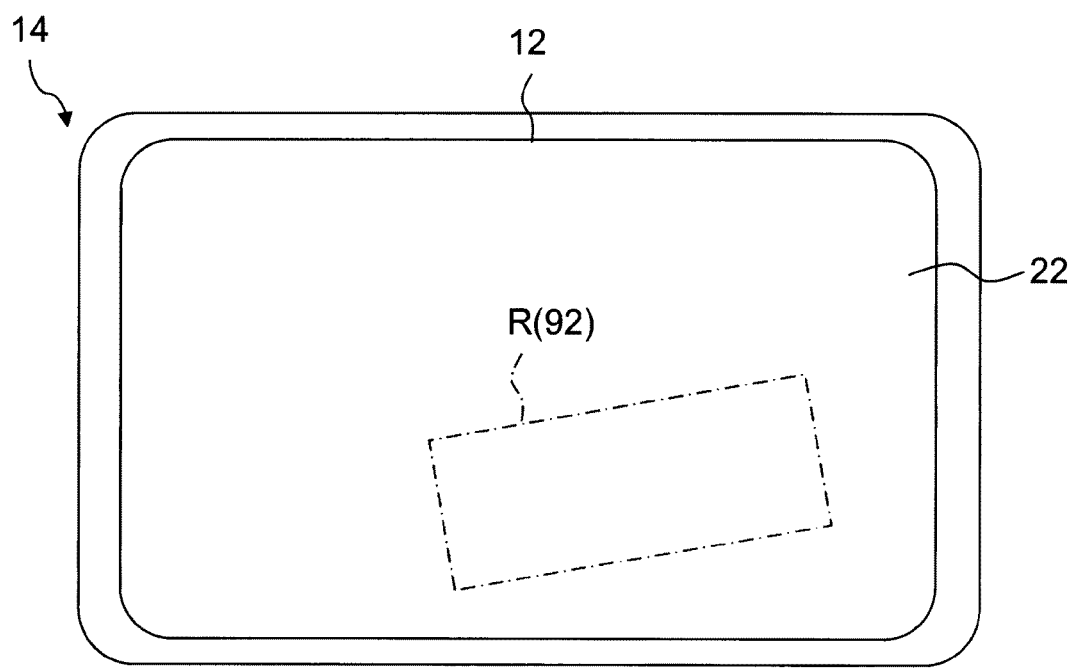

As illustrated in FIG. 9B, there is no display of the virtual input device 96 on the touch panel display 12. In this manner, while the on-panel pad 18 is being used, the virtual input device 96 is continuously displayed on the touch panel display 12.

Effects of Interface Device 24

As described above, the interface device 24 is a device for performing an input to the electronic device 14 in response to an operation by the user Us. The electronic device 14 includes the capacitive touch panel display 12. The interface device 24 includes the on-panel pad 18 and the sensor controller 28. With the on-panel pad 18 arranged on the touch panel display 12, the on-panel pad 18 causes the sensor electrode 26 included in the touch panel display 12 to generate a two-dimensional pattern PT of capacitance. When the two-dimensional pattern PT has been detected, the sensor controller 28 generates or outputs data including operation information in response to a change in capacitance in one or more operation regions 92 defined according to the position where the two-dimensional pattern PT has been detected. The operation information indicates an operation state of the on-panel pad 18 and is different from position information indicating a position detected by the sensor electrode 26.

In this manner, the sensor controller 28 is provided to generate or output the data including the operation information indicating the operation state in response to the generation of the two-dimensional pattern PT of capacitance. Accordingly, the on-panel pad 18 can provide its input function as the "pseudo physical device" with the on-panel pad 18 arranged on the touch panel display 12. Further, the one or more operation regions 92 are defined according to the position where the two-dimensional pattern PT has been detected. This increases the degree of freedom of the arrangement of the on-panel pad 18. Further, since the user Us can directly touch the on-panel pad 18, the user Us can recognize, without relying on the user's own vision, the shape and arrangement of the virtual input device 96 through the sense of touch. This, as a result, improves the operability of the virtual input device 96 through operational support using the on-panel pad 18.

Features of On-Panel Pad 18

The on-panel pad 18 includes the pad body 30 and the one or more conductive members 32. The pad body 30 has at least the front surface 36 and the back surface 38. The one or more conductive members 32 are arranged on the back surface 38 side of the pad body 30. With the on-panel pad 18 arranged on the touch panel display 12, the on-panel pad 18 causes, in a portion of the sensor electrode 26 corresponding to a position pushed by the user Us from the front surface 36 of the pad body 30, a change in capacitance due to the approach of the user Us as a conductor to the portion of the sensor electrode 26. This allows the on-panel pad 18 to provide its input function as the "pseudo physical device" with the on-panel pad 18 arranged on the touch panel display 12.

The pad body 30 may have a three-dimensional shape that is elastically deformable and restorable in at least a height direction. Accordingly, the user Us can perform repetitive operations on the virtual input device 96 and feel a sense of operation of the on-panel pad 18.

The on-panel pad 18 may not cause a change in capacitance over a period before and a period after the user Us contacts the front surface 36 of the pad body 30 maintaining the original shape with the on-panel pad 18 arranged on the touch panel display 12. Accordingly, even when the user Us unintentionally contacts the front surface 36, malfunctions associated with the contact can be reduced.

The stepped portions 40 may be formed on the front surface 36 of the pad body 30 so as to divide the front surface 36 into a plurality of small regions. Accordingly, the user Us can recognize each of the small regions through the user's own sense of touch.

The pad body 30 may be made of a transparent material or a translucent material. Accordingly, the user Us can view and recognize what is displayed on the touch panel display 12 even within a region where the on-panel pad 18 is arranged.

The one or more conductive members 32 may be shaped such that the two-dimensional pattern PT that is rotationally asymmetric is generated. Accordingly, the orientation of the on-panel pad 18 arranged on the touch panel display 12 can uniquely be identified.

Features of Sensor Controller 28

The sensor controller 28 may cause the virtual input device 96 to be displayed within the display region R of the touch panel display 12 by generating or outputting data including the type of the on-panel pad 18 or the virtual input device 96 corresponding to the on-panel pad 18 and the arrangement state of the on-panel pad 18. Visualizing the form of the input device gives a feeling that the input device is real and further improves the operability.

The sensor controller 28 may include the touch IC 50 (the first processor) and the host processor 52 (the second processor). The touch IC 50 (the first processor) generates the heat map 80 representing changes in capacitance on the sensor electrode 26. The host processor 52 (the second processor) detects the presence or absence of a two-dimensional pattern PT based on the heat map 80 supplied from the touch IC 50, and generates or outputs data including operation information when the two-dimensional pattern PT has been detected. Since the processing of detecting the two-dimensional pattern PT requires a high speed and a large amount of computing processing, the host processor 52 performs this detection processing instead of the touch IC 50, reducing the processing load of the touch IC 50. Since the host processor 52, which has a higher computing power than that of the touch IC 50, performs this detection processing, the computing time significantly reduces. Moreover, employing the host processor 52 can enhance the functionality of the interface device 24 using the on-panel pad 18 without significantly changing data processing design of the touch IC 50.

Modifications

First Modification

Figure 10A:
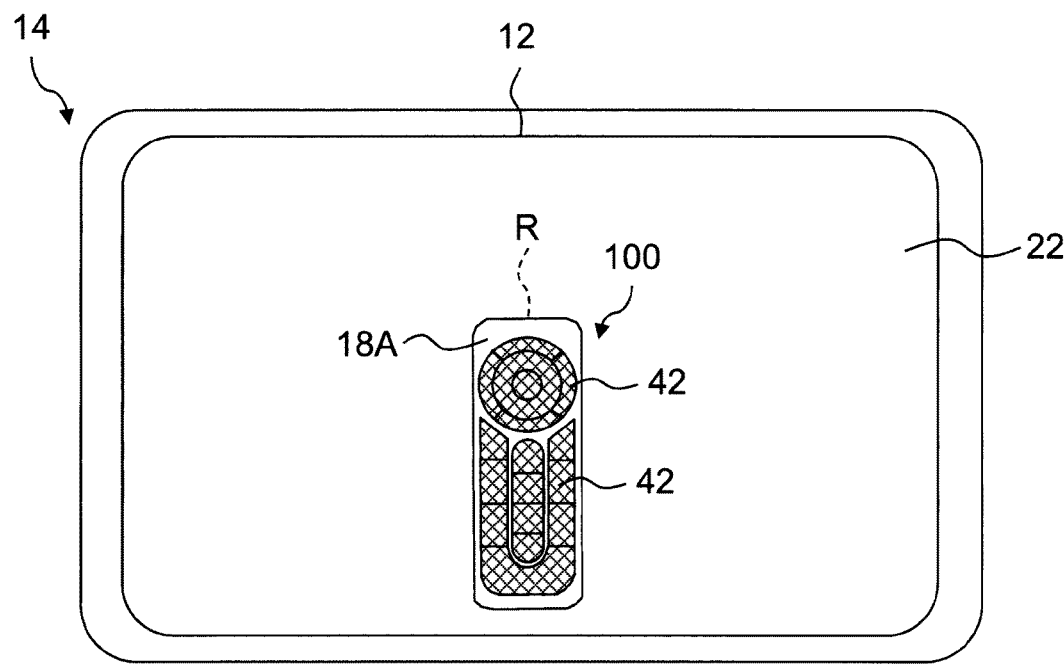
FIGS. 10A and 10B are diagrams each illustrating an on-panel pad according to a first modification being used.

As illustrated in FIG. 10A, an on-panel pad 18A has a rectangular shape in plan view and includes operation elements 42 emulating a touch wheel and a function button. Arranging the on-panel pad 18A on the touch panel display 12 displays a virtual input device 100 emulating a wireless controller within a single display region R.

In this manner, the on-panel pad can be applied to any of input devices with various forms other than the keyboard illustrated in FIGS. 2A and 2B. An input operation performed by the user Us may be an operation that involves the deformation of the on-panel pad or an operation that does not involve the deformation of the on-panel pad. One example of the latter is an eraser that erases a portion of a drawing in response to the movement of the eraser on the touch panel display 12.

Figure 10B:
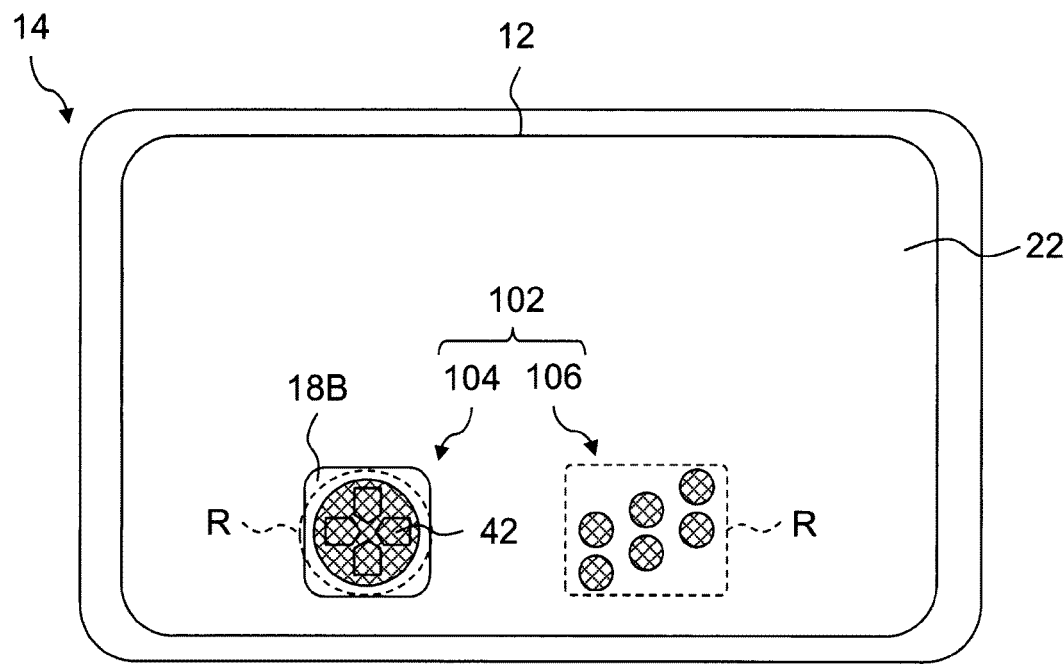

As illustrated in FIG. 10B, an on-panel pad 18B has a square shape in plan view and includes an operation element 42 emulating the shape of a directional pad. Arranging the on-panel pad 18B on the touch panel display 12 displays a virtual input device 102 emulating a game controller within two display regions R. A first input section 104 denotes the directional pad and is displayed inside the on-panel pad 18B. A second input section 106 denotes a plurality of buttons and is displayed outside the on-panel pad 18B.

The on-panel pad 18B allows the user Us to simultaneously operate the directional pad of the first input section 104 with the left hand while operating the buttons of the second input section 106 with the right hand. In this manner, the interface device 24 may cause these operation elements (the second input section 106), which can be operated by touch, to be displayed outside the on-panel pad 18B.

Second Modification

Figure 11A:
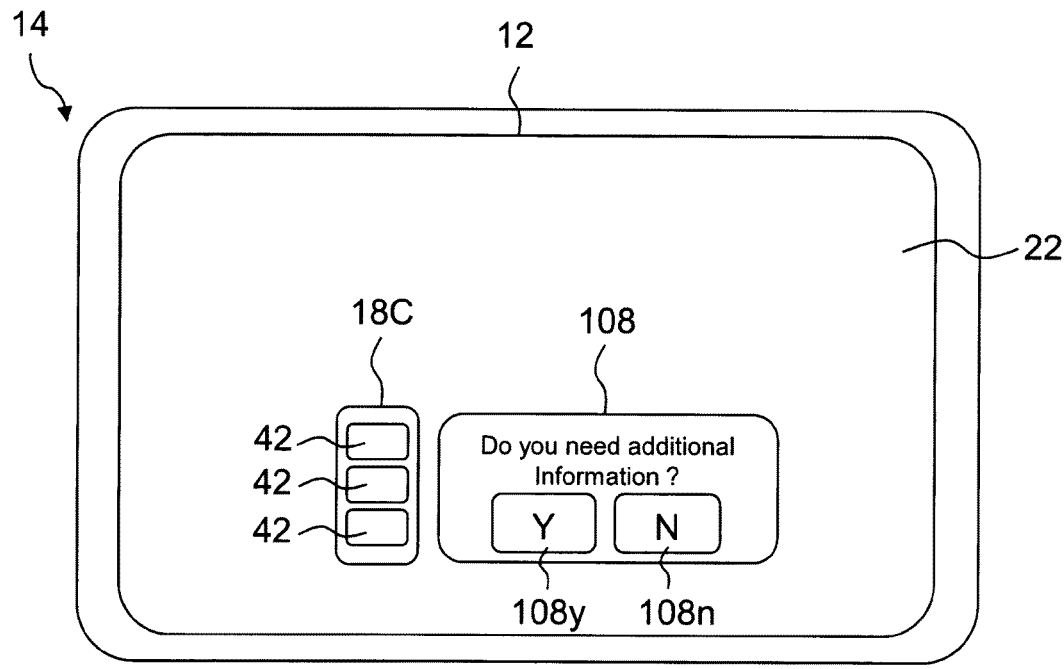
FIGS. 11A and 11B are diagrams each illustrating an on-panel pad according to a second modification being used.

As illustrated in FIG. 11A, an on-panel pad 18C has a rectangular shape in plan view and includes operation elements 42 emulating a plurality of keys. Arranging the on-panel pad 18C on the touch panel display 12 displays a window 108 in the vicinity of the on-panel pad 18C (to the right side of FIG. 11A in this example). Touching an [N] button 108n (No) in the window 108 removes the display of the window 108. Touching a [Y] button 108y (Yes) in the window 108 triggers a transition from the state of FIG. 11A to the state of FIG. 11B.

Figure 11B:
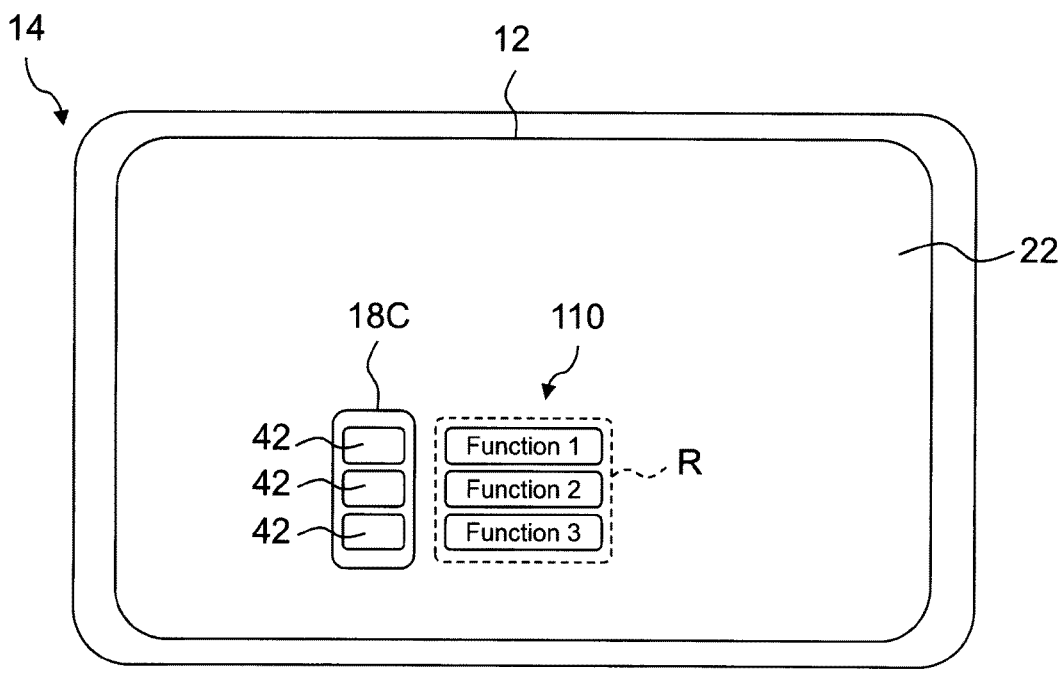

As illustrated in FIG. 11B, guidance information 110 regarding the types or functions of the operation elements 42 is newly displayed on the touch panel display 12 instead of the window 108. The guidance information 110 is displayed so as to correspond to the position of each operation element 42. This arrangement assists the user Us in operation since the user Us can recognize the types or functions of the operation elements 42 at a glance.

In this manner, the interface device 24 may provide a graphical user interface (GUI) that inquires about the need of the display of the operation guidance prior to the display thereof. Alternatively, the interface device 24 may provide a GUI that inquires about the need of the display of the virtual input device together with or separately from the guidance display prior to the display of the virtual input device. Accordingly, the intention of the user Us can be reflected in the display.

Third Modification

Figure 12A:
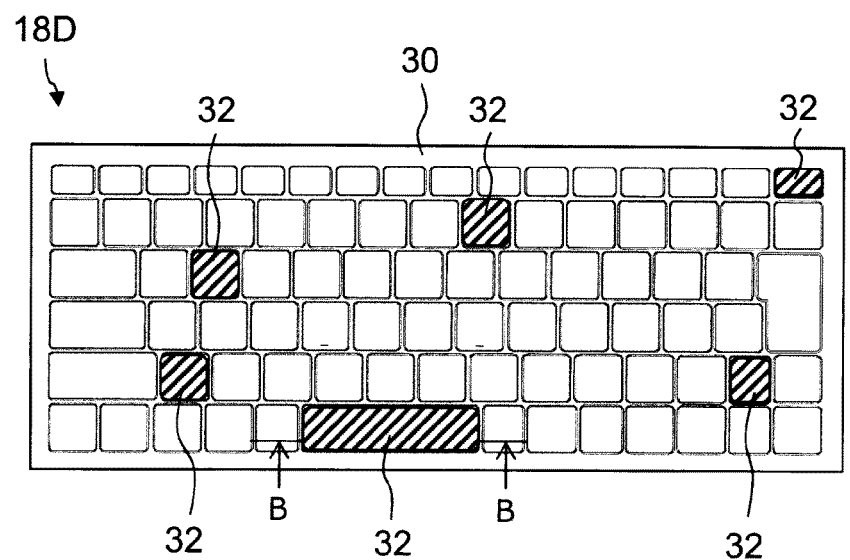
FIGS. 12A and 12B illustrate a detailed configuration of an on-panel pad according to a third modification.
Figure 12B:
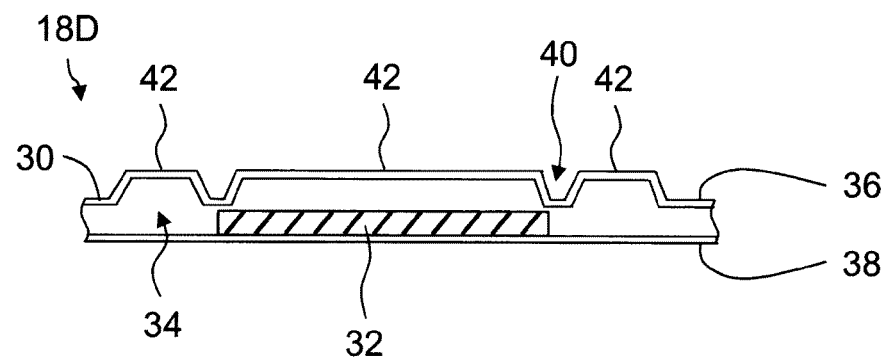

FIGS. 12A and 12B illustrate a detailed configuration of an on-panel pad 18D according to a third modification. More specifically, FIG. 12A is a planar perspective view of the on-panel pad 18D, while FIG. 12B is a cross-sectional view of the on-panel pad 18D taken along line B-B of FIG. 12A. The on-panel pad 18D includes the pad body 30 and one or more (six in this example) conductive members 32. Each of the conductive members 32 is, for example, a rectangular planar member made of metal. All the six conductive members 32 are arranged on the back surface 38 side of the pad body 30. Each of the conductive members 32 is arranged so as to overlap with a corresponding one of a plurality of small regions (operation elements 42) in plan view.

Figure 13A:
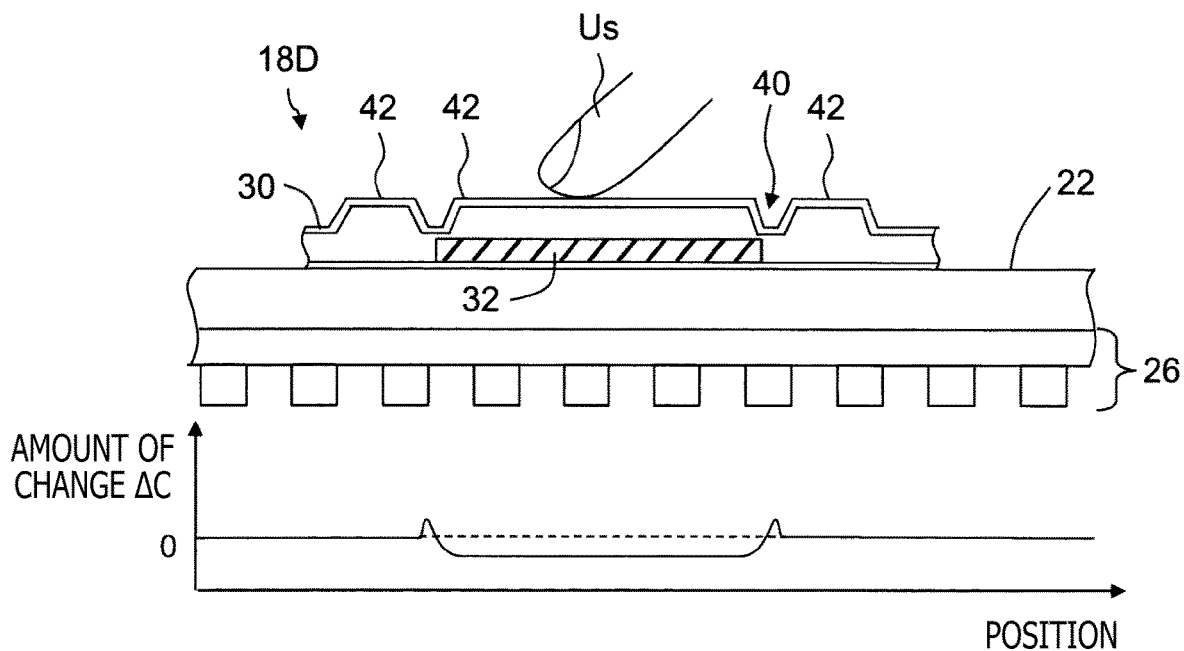
FIGS. 13A and 13B are diagrams each schematically illustrating a correspondence relation between an operation state of the on-panel pad illustrated in FIGS. 12A and 12B and a detection profile.
Figure 13B:
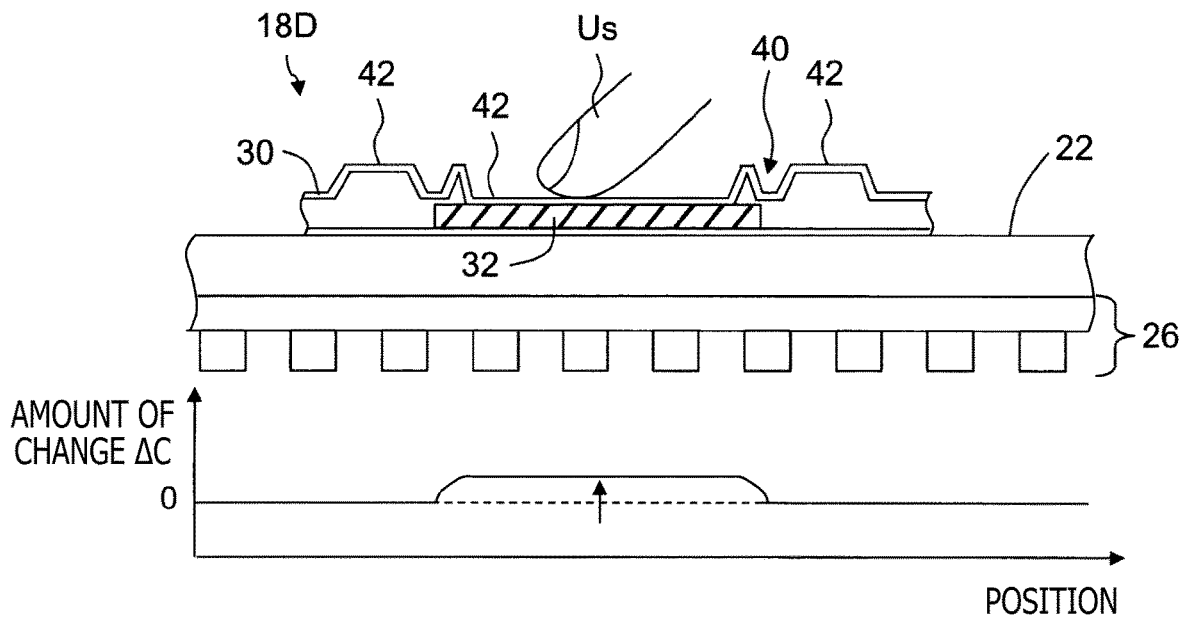

FIGS. 13A and 13B are diagrams each schematically illustrating a correspondence relation between an operation state of the on-panel pad 18D illustrated in FIGS. 12A and 12B and a detection profile. As with FIGS. 5A and 5B, the detection profile corresponds to a graph representing the amount of change $\Delta C$ in capacitance at each of the positions on the sensor electrode 26.

With reference to FIG. 13A, a finger of the user Us is in contact with one of the operation elements 42 of the pad body 30. Since each of the conductive members 32 is located close to the touch surface 22, a change in capacitance is detected at the position of the conductive member 32. That is, the capacitance at the position where the conductive member 32 is located changes to the negative side while the capacitance in the vicinity of the conductive member 32 changes to the positive side. Since the finger of the user Us is distant from the conductive member 32, there is no influence on the detection profile.

With reference to FIG. 13B, the finger of the user Us is pushing the operation element 42 of the pad body 30. Since the finger of the user Us contacts the conductive member 32, the potential of the conductive member 32 serves as GND, and a change in capacitance (the positive side) is detected at the position of the conductive member 32. That is, it is possible to determine whether or not the operation has been made by detecting a change in the profile shape of the two-dimensional pattern PT (an increase in the amount of change $\Delta C$ or reverse of a sign).

In this manner, when a change in capacitance has been detected at any of the positions of the conductive members 32 within the one or more operation regions 92, the sensor controller 28 (the host processor 52) may generate or output data including operation information corresponding to this position. With this configuration as well, an operation state made by the user Us can appropriately be identified.

Fourth Modification

Figure 14:
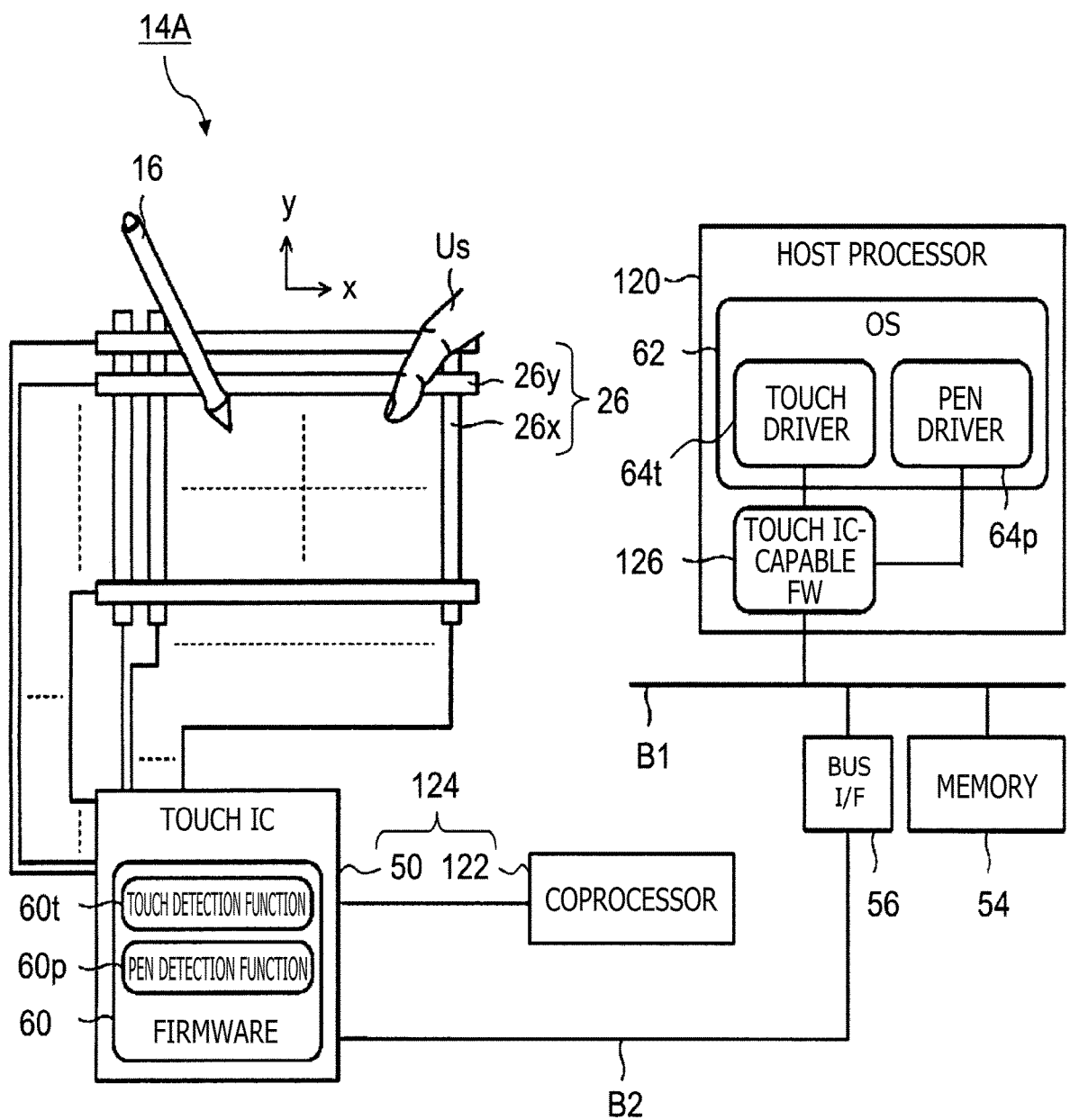
FIG. 14 is a schematic block diagram of an electronic device according to a fourth modification.

FIG. 14 is a schematic block diagram of an electronic device 14A according to a fourth modification in which a sensor controller 124 is incorporated. The electronic device 14A includes a host processor 120 and the sensor controller 124 in addition to the sensor electrode 26 and the memory 54. The sensor controller 124 includes the touch IC 50 (a first processor) and a coprocessor 122 (a second processor).

The coprocessor 122 is an auxiliary processor including, for example, a GPU, and is capable of performing data processing equivalent to that of the touch IC-capable FW 66 (FIG. 3). The coprocessor 122 receives frame data including the heat map 80 from the touch IC 50. Based on the heat map 80, the coprocessor 122 generates the above-described position information or operation information and supplies data including this information to the touch IC 50.

In the case of employing this device configuration, the coprocessor 122 performs data processing instead of the touch IC-capable FW 66 (FIG. 3) so that the interface device 24 can perform the operation similar to that of the embodiment above. In the flowchart illustrated in FIG. 4, the touch IC 50 performs blocks S1 and S2, the coprocessor 122 performs blocks S4 to S9, and the OS 62 of the host processor 120 performs blocks S10 and S11.

In this manner, the sensor controller 124 may include the touch IC 50 (the first processor) and the coprocessor 122 (the second processor). The touch IC 50 (the first processor) generates the heat map 80 representing changes in capacitance on the sensor electrode 26. The coprocessor 122 (the second processor) detects the presence or absence of a two-dimensional pattern PT based on the heat map 80 supplied from the touch IC 50, and generates or outputs data including operation information when the two-dimensional pattern PT has been detected. As with the embodiment above, this configuration also reduces the processing load of the touch IC 50 and facilitates enhancement of the functionality of the interface device 24.

It is to be noted that the embodiments of the present disclosure are not limited to the foregoing embodiment, and that various changes can be made without departing from the spirit of the present disclosure.

What is claimed is:

1. An interface device for performing an input to an electronic device in response to an operation by a user, the electronic device including a capacitive touch panel display, the interface device comprising:
   an on-panel pad which, in operation, causes a plurality of sensor electrodes included in the capacitive touch panel display to generate a two-dimensional pattern of capacitance while the on-panel pad is on the capacitive touch panel display, wherein the on-panel pad includes a pad body having a three-dimensional hollow shape and an interior filled with a fluid, wherein the pad body includes a front surface and a back surface separated by the fluid in the interior of the pad body, wherein the front surface includes an operating element made of a non-conductive and elastic material separated from the back surface by the fluid in the interior and configured to receive the operation by the user; and
   a sensor controller which, in operation, when the two-dimensional pattern generated while the on-panel pad is on the capacitive touch panel display has been detected, generates or outputs data including operation information in response to a change in capacitance generated by a conductive finger of the user contacting and deforming the operating element made of the non-conductive and elastic material, the change in capacitance in a region that is associated with the two-dimensional pattern and that receives an operation of the on-panel pad, the operation information indicating an operation state of the on-panel pad.

2. The interface device according to claim 1, wherein the on-panel pad includes:
   a pad body having at least a front surface and a back surface, and
   one or more conductive members between the front surface and the back surface of the pad body, and
   wherein the two-dimensional pattern caused by the on-panel pad corresponds to a shape of the one or more conductive members.

3. The interface device according to claim 2, wherein the pad body has a three-dimensional shape that is elastically deformable and restorable in at least one direction.

4. The interface device according to claim 2, wherein while the on-panel pad is on the capacitive touch panel display, the on-panel pad causes, in a portion of the sensor electrodes corresponding to a position pushed by the user from the front surface of the pad body, the change in capacitance due to an approach of the user to the portion of the sensor electrodes.

5. The interface device according to claim 2, wherein the on-panel pad does not cause the change in capacitance during a period before and a period after the user contacts the front surface of the pad body, and
wherein the on-panel pad maintains an original shape during the period before and the period after the user contacts the front surface of the pad body.

6. The interface device according to claim 2, wherein stepped portions are formed on the front surface of the pad body, and the stepped portions divide the front surface into a plurality of operation regions.

7. The interface device according to claim 6, wherein each of the one or more conductive members does not overlap any of the plurality of operation regions in plan view or overlaps a corresponding one of the plurality of operation regions in plan view.

8. The interface device according to claim 7, wherein each of the one or more conductive members overlaps the corresponding one of the plurality of operation regions in plan view, and
wherein, when the change in capacitance has been detected at a position of the one or more conductive members in one of the operation regions, the sensor controller generates or outputs the data including the operation information corresponding to the position.

9. The interface device according to claim 2, wherein the pad body is made of a transparent material or a translucent material.

10. The interface device according to claim 2, wherein the one or more conductive members are shaped such that the two-dimensional pattern caused by the on-panel pad is rotationally asymmetric.

11. The interface device according to claim 1, wherein the sensor controller generates or outputs data including a type of the on-panel pad or a virtual input device corresponding to the on-panel pad and an arrangement state of the on-panel pad, and
the sensor controller causes the virtual input device to be displayed within a display region of the capacitive touch panel display based on the data.

12. The interface device according to claim 1, wherein the sensor controller includes:
   a first processor which, in operation, generates a heat map representing changes in capacitance on the sensor electrodes, and
   a second processor which, in operation, detects presence or absence of the two-dimensional pattern caused by the on-panel pad based on the heat map supplied from the first processor and generates or outputs the data including the operation information when the two-dimensional pattern has been detected.

13. An on-panel pad used with an electronic device including a capacitive touch panel display, the on-panel pad comprising:
   a pad body having a three-dimensional hollow shape and an interior filled with a fluid, wherein the pad body includes at least a front surface and a back surface separated by the fluid in the interior, wherein the front surface includes an operating element made of a non-conductive and elastic material separated from the back surface by the fluid in the interior and configured to receive an operation by a user; and
   one or more conductive members between the front surface and the back surface of the pad body,
   wherein, in operation, the on-panel pad causes a plurality of sensor electrodes included in the capacitive touch panel display to generate a two-dimensional pattern of capacitance in response to a conductive finger of the user contacting and deforming the operating element made of the non-conductive and elastic material while the on-panel pad is on the capacitive touch panel display.

14. The on-panel pad according to claim 13, wherein, while the back surface of the pad body is on and faces the capacitive touch panel display, the two-dimensional pattern caused by the on-panel pad corresponds to a shape of the one or more conductive members, and
wherein the on-panel pad causes, in a portion of the sensor electrodes corresponding to a position pushed by a user from the front surface of the pad body, a change in capacitance due to an approach of the user to the portion of the sensor electrodes.

15. The on-panel pad according to claim 13,
wherein the pad body has a three-dimensional shape that is elastically deformable and restorable in at least one direction.

16. The on-panel pad according to claim 13,
wherein stepped portions are formed on the front surface of the pad body, and the stepped portions divide the front surface into a plurality of operation regions.

17. The on-panel pad according to claim 16,
wherein each of the one or more conductive members does not overlap any of the plurality of operation regions in plan view or overlaps a corresponding one of the plurality of operation regions in plan view.

18. The on-panel pad according to claim 13,
wherein the on-panel pad does not cause a change in capacitance during a period before and a period after the user contacts the front surface of the pad body, and
wherein the on-panel pad maintains an original shape during the period before and the period after the user contacts the front surface of the pad body.

19. The on-panel pad according to claim 13,
wherein the pad body is made of a transparent material or a translucent material.

20. The on-panel pad according to claim 13,
wherein the one or more conductive members are shaped such that the two-dimensional pattern caused by the on-panel pad is rotationally asymmetric.

\* \* \* \* \*